United States Patent
Gil et al.

(10) Patent No.: US 12,282,208 B2
(45) Date of Patent: Apr. 22, 2025

(54) METHOD FOR DETERMINING AN OPHTHALMIC COMPONENT

(71) Applicant: Essilor International, Charenton-le-pont (FR)

(72) Inventors: Paul Gil, Charenton-le-pont (FR); Jean Sahler, Charenton-le-pont (FR); Aurélie Le Cain, Charenton-le-pont (FR); Bruno Amir, Charenton-le-pont (FR)

(73) Assignee: Essilor International, Charenton-le-Pont (FR)

( * ) Notice: Subject to any disclaimer, the term of this patent is extended or adjusted under 35 U.S.C. 154(b) by 941 days.

(21) Appl. No.: 17/260,170

(22) PCT Filed: Jul. 18, 2019

(86) PCT No.: PCT/EP2019/069440
§ 371 (c)(1),
(2) Date: Jan. 13, 2021

(87) PCT Pub. No.: WO2020/016384
PCT Pub. Date: Jan. 23, 2020

(65) Prior Publication Data
US 2022/0365366 A1   Nov. 17, 2022

(30) Foreign Application Priority Data
Jul. 18, 2018   (EP) ..................................... 18305984

(51) Int. Cl.
*G02C 7/02*   (2006.01)
(52) U.S. Cl.
CPC .................................. *G02C 7/027* (2013.01)

(58) Field of Classification Search
CPC ........ G02C 5/001; G02C 5/00; G02C 13/005; G02C 13/003; G02C 7/028
USPC ......... 351/178, 159.75–159.77, 159.01, 205, 351/246
See application file for complete search history.

(56) References Cited

U.S. PATENT DOCUMENTS

| | | | |
|---|---|---|---|
| 7,980,692 B2 * | 7/2011 | Fisher ..................... | G02C 7/061 351/159.74 |
| 2003/0107707 A1 | 6/2003 | Fisher et al. | |
| 2004/0046287 A1 * | 3/2004 | Andino ................... | C08L 75/16 264/401 |
| 2014/0347265 A1 * | 11/2014 | Aimone .................. | H04W 4/30 345/156 |

(Continued)

OTHER PUBLICATIONS

International Search Report and Written Opinion issued Sep. 30, 2019 in PCT/EP2019/069440 filed Jul. 18, 2019.

*Primary Examiner* — Travis S Fissel
(74) *Attorney, Agent, or Firm* — Oblon, McClelland, Maier & Neustadt, L.L.P.

(57) ABSTRACT

Method for determining an ophthalmic equipment which is adapted to the characteristics of at least a given wearer, the method being implemented by a processor, the method comprising: —providing access to digital content of the wearer (S100), —analyzing the digital content of the wearer so as to extract wearer data (S200), —processing the wearer data so as to obtain a set of characteristics (S300), the set of characteristics comprising at least one category and at least one associated score, and —determining at least one component of an ophthalmic equipment based on the obtained set of characteristics (S400).

12 Claims, 2 Drawing Sheets

(56) References Cited

U.S. PATENT DOCUMENTS

| | | | |
|---|---|---|---|
| 2015/0055085 A1* | 2/2015 | Fonte | H04N 23/611 |
| | | | 700/98 |
| 2015/0055086 A1 | 2/2015 | Fonte et al. | |
| 2015/0154322 A1 | 6/2015 | Fonte et al. | |
| 2015/0154678 A1 | 6/2015 | Fonte et al. | |
| 2015/0154679 A1 | 6/2015 | Fonte et al. | |
| 2015/0212343 A1 | 7/2015 | Fonte et al. | |
| 2016/0062151 A1 | 3/2016 | Fonte et al. | |
| 2016/0062152 A1 | 3/2016 | Fonte et al. | |
| 2016/0327813 A1* | 11/2016 | Baranton | A61B 3/0025 |
| 2017/0068121 A1 | 3/2017 | Fonte et al. | |
| 2017/0269385 A1 | 9/2017 | Fonte et al. | |
| 2017/0371178 A1* | 12/2017 | Crespo | G02C 7/024 |
| 2018/0103903 A1* | 4/2018 | Tzvieli | G01J 5/0025 |
| 2018/0299704 A1 | 10/2018 | Fonte et al. | |
| 2019/0146246 A1 | 5/2019 | Fonte et al. | |

* cited by examiner

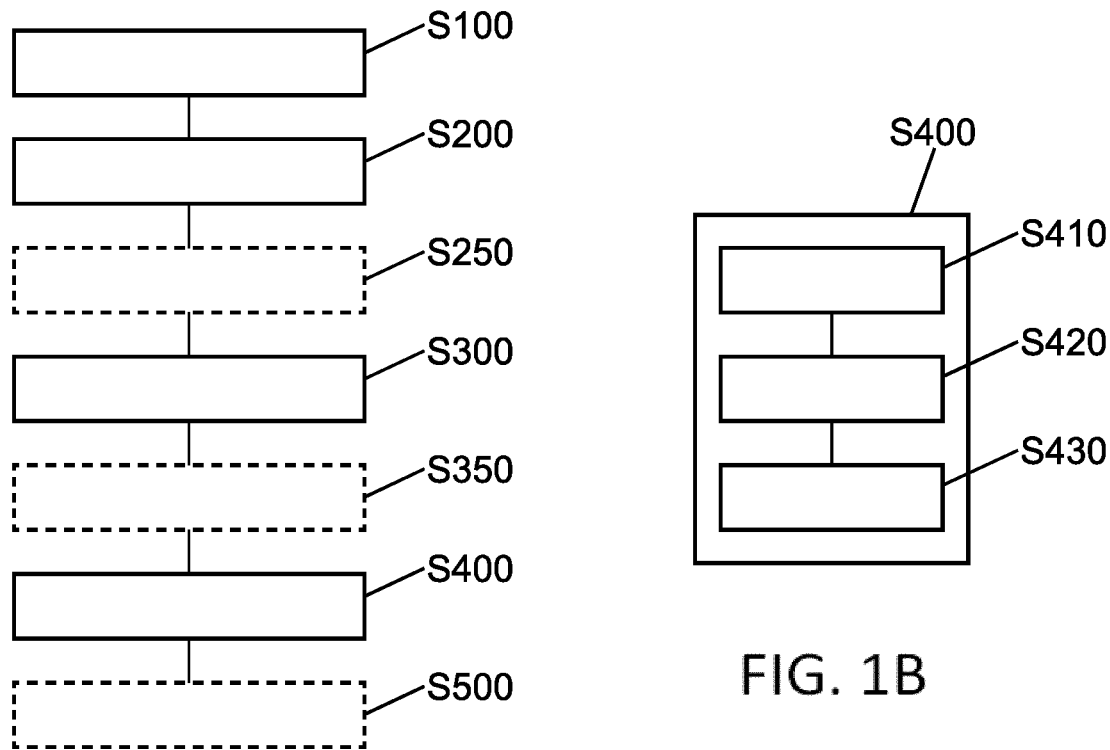
FIG. 1A
FIG. 1B
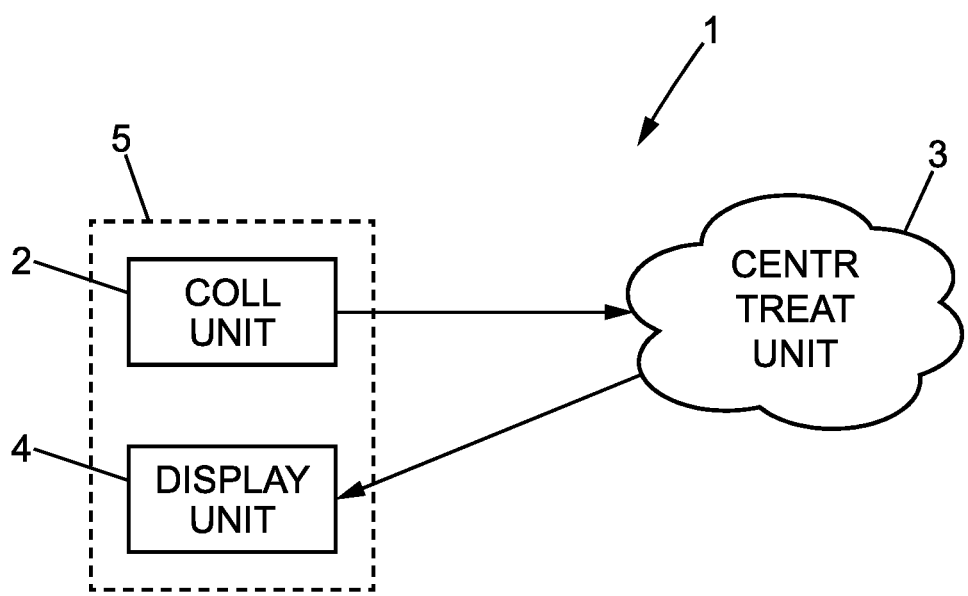
FIG. 2

METHOD FOR DETERMINING AN OPHTHALMIC COMPONENT

FIELD OF THE INVENTION

The present invention relates to the determination of an ophthalmic equipment which is adapted to the wearers' needs.

BACKGROUND OF THE INVENTION

The ophthalmic equipment is usually a pair of glasses and comprises a plurality of components such as the lenses, the post-treatment layers, the frame, etc. For each component, the wearer has to choose among a plurality of references, some references being adapted to his needs or particularities, others not. Also some components comprise some features which have an influence on the performance of the eyewear and their influence is difficult to perceive for the uninformed wearer. The eye-care professional thus needs to spend time with the wearer in order to understand his needs and particularities and to help him choose the component that is best adapted. Understanding the needs of the wearer is quite subjective as it relies on the question asked by the eye-care professional and on the answers of the wearer which can be biased. Sometimes also, the wearer is not fully aware of his needs. For example, if the eye-care professional asks the wearer for which type of activity the eyewear is intended to be used, the wearer might quote some activities but forget to mention others that he performs in his free time.

Further, it is difficult to determine an ophthalmic equipment that is adapted to the wearer's needs and particularities if the wearer wishes to buy online his ophthalmic equipment. Even if the wearer can fill in an online questionnaire, this process takes time for the wearer and the result may not be accurate for the reasons mentioned above.

PRESENTATION OF THE INVENTION

In view of the above, one aim of the invention is to alleviate at least part of the inconveniences of the prior art.

In particular, one aim of the invention is to simplify the identification of the wearer's needs and particularities. Another aim of the invention is to simplify the determination of an ophthalmic equipment adapted to the wearer's needs. Another aim of the invention is to provide an ophthalmic equipment that is better adapted to the wearer's needs and particularities.

To this end, it is proposed, according to a first aspect, a method for determining an ophthalmic equipment which is adapted to the characteristics of at least a given wearer, the method being implemented by a processor, the method comprising:

providing access to digital content of the wearer,
analyzing the digital content of the wearer so as to extract wearer data,
processing the wearer data so as to obtain a set of characteristics, the set of characteristics comprising at least one category and at least one associated score, and
determining at least one component of an ophthalmic equipment based on the obtained set of characteristics, The digital content comprises at least one of data relative to the online activity of the wearer, pictures, text, documents comprising photos, and/or text stored in the memory of a personal device such as a smartphone, a tablet or a computer (when the method is implemented by a program installed on a personal device of the wearer). The online activity relates to the use of internet to send text messages, photos or documents, to consult websites and to interact with people or to react to content posted via social networks or websites such as forums of discussion or blogs.

According to an embodiment, at least one category relates to at least one of:
a behavior of the wearer,
an environment of the wearer.

Preferably, the behavior of the wearer relates at least one of:
an activity of the wearer,
a clothing style of the wearer,
a postural behavior of the wearer.

According to an embodiment, each score associated to a category is computed based on at least one of a relative intensity, a frequency or a duration of the wearer having a behavior related to the category or being in an environment related to the category.

According to an embodiment, providing access to the digital content of the wearer comprises collecting the wearer data comprises navigation data of the wearer, for example navigation cookies.

According to an embodiment, the wearer data comprises pictures and/or videos and processing the wearer data comprises attributing a category to the pictures and/or videos.

According to an embodiment, the wearer data comprises words and processing the wearer data comprises attributing a category based on the presence, within the words comprised in the wearer data, of key-words representative of the category.

According to an embodiment, the digital content of the wearer comprises social network data, and analyzing social network data comprises determining at least one social network data associated with a flag indicating an interaction of a wearer with said social network data and extracting wearer data from said social network data.

According to an embodiment, a score assigned to a category corresponds to a frequency of appearance of the wearer data corresponding to said category.

According to an embodiment, determining at least one component of an ophthalmic equipment comprises determining, by implementing a decision tree, at least one component of the ophthalmic equipment, the decision tree comprising leafs and nodes, the leafs corresponding to at least one component of the ophthalmic equipment to be proposed and some of the nodes corresponding to conditions to be met depending on the values of scores of the at least one category.

According to an embodiment, determining at least one component of an ophthalmic equipment comprises:
determining, for the wearer, a weighted score for each category,
determining, for each component of a set predetermined components of an ophthalmic equipment, a weighted score for each category, and
determining the at least one component of the ophthalmic equipment based on the wearer weighted score and on the components weighted scores of each categories.

According to an embodiment, determining the at least one component of the ophthalmic equipment comprises determining a coating based on at least a score of a category relative to the environment of the wearer.

According to an embodiment, determining the at least one component of the ophthalmic equipment comprises determining a frame based on the scores of categories relative to a clothing style of the wearer and/or an activity of the wearer.

According to an embodiment, determining the at least one component of the ophthalmic equipment comprises determining a lens design based on the scores of categories relative to an activity of the wearer.

According to an embodiment, the method further comprises a step of storing the set of characteristics of the wearer together with an identification data of the wearer into a database.

It is also proposed, according to a second aspect, a computer program comprising one or more stored sequences of instructions that is accessible to a processor and which, when executed by the processor, causes the processor to carry out the steps of the method previously described.

It is also proposed, according to a third aspect, a storage medium storing one or more stored sequences of instructions of the computer program previously described.

According to the invention, the wearers just have to provide access to its digital data in order to obtain at least a component of its ophthalmic equipment—when not the entire ophthalmic equipment—that is better adapted to his needs and particularities. The wearer thus saves time as he does not have to fill in a questionnaire or to discuss with the eye-care professional. The digital content comprises at least one of data relative to the online activity of the wearer, pictures, text, documents comprising photos, and/or text stored in the memory of a personal device such as a smartphone, a tablet or a computer (when the method is implemented by a program installed on a personal device of the wearer), sensor data collected by smartframes, smartframes being spectacle frames comprising sensors. The online activity relates to the use of internet to send text messages, photos or documents, to consult websites and to interact with people or to react to content posted via social networks or websites such as forums of discussion or blogs. The wearer data extracted from its digital content may be more exhaustive to establish its profile. The profile of the wearer may take into account for example different categories relating for example to the type of activities performed by the wearer, the clothing style of the wearer, the postural behavior of the wearer and the environment of the wearer. The profile of the wearer may also be better quantified by attributing scores depending for example on a relative intensity, frequency or duration of the wearer having a particular behavior or being in a particular environment. The components of the ophthalmic equipment are then determined based on the score relating to each category and may better correspond to the wearer's needs and particularities. Also, the determining of the ophthalmic equipment may be fully automatized, which also results in a gain of time.

BRIEF DESCRIPTION OF THE DRAWINGS

Further details, aspects and embodiments of the proposed solution will be described, by way of example only, with reference to the drawings.

FIG. 1A illustrates the method for determining an ophthalmic equipment according to one embodiment, FIG. 1B illustrates in more details a step of determining at least a component of an ophthalmic equipment according to a particular embodiment, FIG. 2 illustrates schematically a system that may be used to implement the method of FIG. 1A according to an embodiment.

DESCRIPTION

Figure 3:
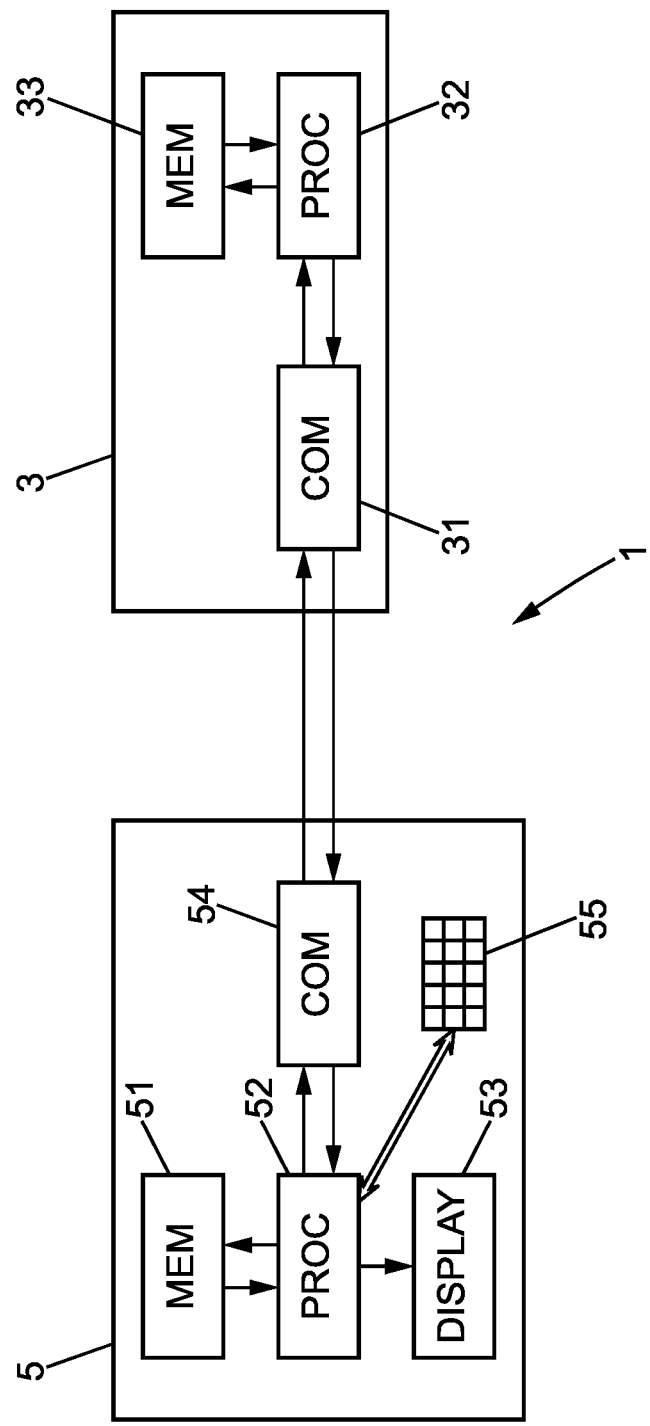
FIG. 3 further illustrates the system of FIG. 2 according to an embodiment.

FIG. 1A illustrates a method for determining an ophthalmic equipment according to an embodiment.

The method of FIG. 1A comprises a step S100 of providing access to the digital content of the wearer, a step S200 of analyzing the digital content to extract wearer data, a step S300 of processing the wearer data so as to obtain a set of characteristics, a step S400 of determining at least one component of an ophthalmic equipment based on the obtained set of characteristics and an optional step S500 of determining the ophthalmic equipment.

The expression "digital content" refers to at least one of data relative to the online activity of the wearer, pictures, text or documents comprising photos and/or text stored in the memory of a personal device such as a smartphone, a tablet or a computer (when the method is implemented by a program installed on a personal device of the wearer), sensor data collected from smartframes.

Further, the expression "online activity" relates to the use of internet to send text messages, photos or documents, to consult websites and to interact with people or to react to content posted via social networks or websites such as forums of discussion or blogs. The online activity may be traced using data such as the history of navigation and the navigation cookies of the wearer, for example, and/or by studying the activity of the wearer on a social network, blog or forum of discussion knowing the username or login of the wearer and eventually an associated password.

The step S100 of providing access to the digital content of the wearer may comprise one or more of the following sub-steps:
providing access to the online activity of the wearer, by providing, for example, access to
social media data of a social media network used by the wearer for example using the login and the password of the wearer,
navigation data of the wearer such as the history of navigation or navigation cookies,
providing access to sensor data measured by smartframes,
providing access to the pictures stored in a memory of a personal device such as a smartphone, a tablet or a computer, for example,
providing access to text messages sent or received via a personal device such as a smartphone, for example, including those stored in the memory of the smartphone,
providing access to documents sent or received via a personal device such as a smartphone, for example, including those stored in the memory of the smartphone.

Depending on the sub-step above, providing access may comprise at least one of:
providing permission to access data,
providing an access path to said data,
providing a login or a username,
providing a password associated to said login or username, In step S200, the digital content is analyzed to extract pertinent wearer data that is processed in step S300 to obtain a set of characteristics comprising at least one category and at least one associated score, the set of characteristics defining the profile of the wearer.

The pertinent wearer data may relate to at least one of:
pictures or videos,
words or expressions,
localization data of the wearer.

They may relate also to:
biometric data of the wearer,
3D scans of the wearer,
a number of transitions between indoor and outdoor deduced from measurements of intensity and/or light spectrum collected by the sensors of a smartframe.

According to an embodiment, the pertinent wearer data may relate to pictures or videos wherein the wearer may be seen, or pictures or videos taken by the wearer, the pictures or videos may be retrieved from messages stored in an application, from the memory of a personal device of the wearer or from the analysis of the online activity of the wearer.

The words or expressions may be retrieved from text messages stored in the memory of a smartphone, for example, or retrieved from the analysis of the online activity of the wearer using a semantic analysis.

The localization data may be obtained from metadata comprised in the relevant pictures or videos, or from the analysis of the online activity. According to an embodiment, the localization data may be obtained from social network data, in particular an online status of the user or an information on the user profile for example.

Analyzing the online activity may comprise:
analyzing the content of websites visited by the wearer using navigation cookies,
analyzing the content of websites visited by the wearer by retrieving using the navigation history,
the content of websites may comprises a purchase history of the wearer for example,
analyzing social media data, wherein analyzing social media data comprises determining at least one social network data associated with a flag indicating an interaction of a wearer with said social network data and extracting wearer data from said social network data. The social network data may be an online status or a post for example. The flag indicating an interaction of the wearer may be a flag indicating that:
  the wearer has clicked on a predetermined icon associated to the social network data, such as a "like" button or smiley of the social network Facebook™ or a dislike button on the social network Youtube™, for example,
  the wearer has shared the associated social network data, for example retweeted the tweet of a user of the social network Tweeter™ or shared the Facebook™ post of a user of the social network Facebook™, for example,
analyzing the content of blogs or forum of discussion, i.e. the posts of the wearer and/or the comment of the wearer on a post.

In step S300, the wearer data is processed to obtain a set of characteristics comprising at least one category and at least one associated score.

Preferably, the categories may relate to at least one of a behavior of the wearer or an environment of the wearer.

As an example, the behavior of the wearer may relate to at least one of:
an activity of the wearer, such as a sport activity, a free time activity for example,
a clothing style of the wearer, such as sportive, chic, casual, for example,
a postural behavior of the wearer, such as eye-head behavior for example, wherein the postural behavior may be obtained through analysis of pictures or videos of the wearer for example.

As an example, the environment of the wearer may relate to whether the environment is sunny and/or humid and may be obtained from statistics on a number of hours of sun over a predetermined period and on a mean hydrometry associated to the localization data, for example. The environment of the wearer may also relate to a particular localization, for example in a particular region, whose sun exposure and mean hydrometry may be determined known.

The categories and associated scores may be attributed in different ways.

For example, when the wearer data comprises pictures and/or videos, processing the wearer data comprises attributing a category to the pictures and/or videos. This category may be attributed using a classification algorithm which is trained on a set of reference pictures or videos of reference persons performing a particular type of activity or having a particular clothing style, for example. Concerning the postural behavior of the wearer, parameters such as the eye-head behavior for example may be inferred from pictures or frames extracted from videos. According to the values of these parameters, a classification algorithm may be used to classify the wearer into one of a plurality of categories.

For example, when the wearer data comprises words, processing the wearer data comprises attributing a category based on the presence, within the words comprised in the wearer data, of key-words representative of the category.

According to an embodiment, each score associated to a category may be computed based on at least one of a relative intensity, frequency or duration of the wearer having a behavior related to the category or being in an environment related to the category.

According to an embodiment, a score assigned to a category corresponds to a frequency of appearance of the wearer data corresponding to said category over a predetermined period.

Some examples of categories and associated scores are presented in the following table:

TABLE 1 categories relating to a behavior or an environment of the given wearer and associated scores

| category | duration | frequency | intensity |
|---|---|---|---|
| handiwork | ★★★☆☆ | ★★☆☆☆ | ★☆☆☆☆ |
| running | ★☆☆☆☆ | ★★☆☆☆ | ★☆☆☆☆ |
| sport | ★★★☆☆ | ★★★☆☆ | ★★★☆☆ |
| driving | ★☆☆☆☆ | ★★☆☆☆ | ★☆☆☆☆ |
| reading | ★★★★☆ | ★★★☆☆ | |
| computer | ★★☆☆☆ | ★★★★☆ | ★★★★☆ |
| chic | ★★★☆☆ | ★★★☆☆ | ★★★☆☆ |
| casual | ★★☆☆☆ | ★★★★☆ | ★★★★☆ |
| Sunny environment | ★★★☆☆ | ★★☆☆☆ | ★★☆☆☆ |
| Humid environment | ★★★☆☆ | ★★☆☆☆ | ★★★☆☆ |

The method may further comprise an optional step S250 of collecting complementary data directly from the wearer or from the digital content of the wearer and determining at least one component of an ophthalmic equipment is also based on the complementary data, the complementary data being at least one of:
an age of the wearer,
prescription data for the wearer,
biometric data,
optical pathology,
sensitivity to glare, data relative to the satisfaction of the wearer regarding a particular component of an ophthalmic equipment.

Optionally, the method may further comprise a step S350 of storing the set of characteristics of the wearer comprising at least one category and at least one associated score, and eventually the complementary data, with an identification data of the wearer into a database.

In step S400, at least one component of an ophthalmic equipment is determined based on at least each determined score of at least one category. Optionally, the at least one component may be determined also based on the complementary data of step S250.

Preferably, the component of an ophthalmic equipment may be one of:
- a lens design, wherein a lens design comprises a set of optimization parameters and/or a set of instructions configured to be used in conjunction with the prescription data to determine at least one surface of an ophthalmic lens,
- a coating or post-treatment layer of the ophthalmic lens or a combination of post-treatment layers,
- a frame,
- a head-mounted display design, wherein the head-mounted display design comprises the dimensions and positions of the display viewing area for example,
- a type and/or a control mode of an active lens, wherein the active lens may be an ophthalmic lens comprising an electrochromic layer whose transmission may be varied depending on the voltage applied on both sides of the active lens. The type of active lens thus refers to the type of electrochromic layer and the control mode to the type of command signals or electrical voltage applied on the active lens.

Thus, the ophthalmic equipment may be a pair of standard ophthalmic glasses with prescription or sunglasses with or without prescription or a pair of glasses comprising a head-mounted display.

Based on the obtained set of characteristics, i.e. the scores of the different categories and eventually the complementary data, at least a component of an ophthalmic equipment may be determined. The at least a component may be determined by selecting a component among a set of predetermined component.

According to an embodiment, a coating, i.e. a post-treatment layer of the ophthalmic lens, may be determined based on categories relative to the environment of the wearer and on their associated scores.

Post-treatment layers may comprise:
- a variably or permanently tinted layer,
- a polarizing layer,
- an anti-breakage layer, also called hard coat,
- an anti-scratch layer,
- an anti-reflection layer, and
- an anti-smudge layer, also called top coat, which is oleophobic in order to avoid having finger marks on the ophthalmic lens and also hydrophobic in order to be water-repellent.

According to an embodiment, a combination of a plurality of post-treatment layers as defined above may be determined based on the environment of the wearer and on the behavior of the wearer. For example, the combination of post-treatment layers may be particularly adapted for a wearer that does a lot of handiwork in a particular environment among other activities of the wearer of for a wearer that works a lot with its computer. The scores of each category may be considered to find the better compromise as will be shown later.

Further, the anti-smudge layer, which is water-repellent is not compatible with an anti-fog layer which aims at providing an homogenous layer of water on the ophthalmic lens. Thus, either an anti-smudge layer or an anti-fog layer may be comprised within the combination of a plurality of post-treatment layers. Also, some of those post-treatment layers like the tinted layer, the anti-reflection layer, for example, are optional and may not be comprised within the combination of post-treatment layers.

According to an embodiment, a frame may be determined based on the scores of categories relative to a clothing style of the wearer and/or an activity of the wearer. For example, a type of frame may be chosen according to the clothing style of the wearer but also on the type of activities he performs. If the wearer performs a lot of handiwork, for example, a frame which protects the eyes of the wearer and corresponds to its clothing style would be particularly adapted.

According to an embodiment, a lens design may be determined based on the scores of categories relative to an activity of the wearer and/or a postural behavior of the wearer. Depending on some postural behaviors of the wearer and on the activity of the wearer, some particular field of views may be considered. Some other parameters such as the prescription of the wearer may also be considered.

Below are described some methods for determining a component of the ophthalmic equipment based on the obtained set of characteristics.

Embodiment 1: Determining a Component According to a Decision Tree

According to an embodiment, the at least component of an ophthalmic equipment is determined in step S400 by implementing a decision tree.

A decision tree comprises a set of conditions, comprised within the nodes of the decision tree and a set of leaves. Each leaf is reached when a particular set of conditions is met. Depending on which conditions are met, at least a component of an ophthalmic equipment may be determined.

Some of the nodes may comprise conditions to be met depending on the values of the scores of at least one category. Optionally, some of the nodes may comprise conditions based on the complementary data collected in step S250 such as the age of the wearer, for example.

As an example, a person being less than 15 years old and performing the activity "sports" with a duration inferior to a predetermined duration, will be proposed an ophthalmic equipment comprising a short vision lens, a coating having a light permanent tint, an anti-fog layer, and a covering frame.

A person being between 16 and 40 years old and performing the activity "sports" with a duration greater than a predetermined duration, will be proposed a progressive lens having four zones of vision and a polarizing layer.

A person being more than 45 years old and performing the activity "sports" with a duration greater than a predetermined duration will be proposed a progressive lens premium with a blue-cut photo-protection treatment.

According to another embodiment, each component of an ophthalmic equipment may be determined based on other methods based on machine learning such as clustering or classification. In that case, the characteristics of a set of reference wearers, wherein the set of characteristics comprises at least one category and at least one associated score, are collected together with the features of at least one component of the ophthalmic equipment. It is thus possible to determine a component of an ophthalmic equipment based on the scores of at least one category of the wearer.

Embodiment 2: Determining a Component Based on Weighted Scores of a Plurality of Categories Calculated for Each Component of a Set of Predetermined Components According to an embodiment, the step S400 of determining at least one component of an ophthalmic equipment comprises a sub-step S410 of determining, for the wearer, a weighted score for each category, a sub-step S420 of determining, for each component of a set predetermined components of an ophthalmic equipment, a weighted score for each category, and a sub-step S430 of determining the at least one component of the ophthalmic equipment based on the wearer weighted score and on the components weighted scores of each categories. The step S400 is illustrated in FIG. 1B.

In step S410, for the given wearer, a weighted score $W_i$ is determined for each category i as a function of the scores of each category. For example, a weighted score $W_i$ is calculated as a function of the duration, frequency and intensity scores of each category. A single score is then obtained for each category which enables to establish a profile of the given wearer.

The table 2 below illustrates some of the weighted scores calculated for the categories of the example of table 1.

TABLE 2

| | weighted score of categories calculated for the given wearer | | | | | |
|---|---|---|---|---|---|---|
| | driving | reading | sport | computer | handiwork | running |
| Weighted score of the given wearer $W_i$ | $W_1 = 1$ | $W_2 = 0, 2$ | $W_3 = 0, 4$ | $W_4 = 0, 2$ | $W_4 = 0, 1$ | $W_5 = 1$ |

In step S420, for each component of a set of predetermined components, a weighted score $C_{j,i}$ is determined for each category.

Each component is defined by a set of technical specifications. For example, a lens design may be defined by its field width and its resultant astigmatism in the Far View (FV), Intermediate View (IV), Near View (NV), respectively and a frame may be defined by its abrasion resistance, hydrophobia, hold, boxing, mass, shape, esthetics, robustness, face covering factor, color, for example.

The table 3 below illustrates some of the technical specifications of a set of predetermined lens designs, for example, and their value $T_{j,k}$, j corresponding to the index of the component considered and k corresponding to the technical specification considered.

TABLE 3

| | value of the technical specifications for each lens design | | | | | |
|---|---|---|---|---|---|---|
| Lens design | Field width (FV) | Field width (IV) | Field width (NV) | Resultant Astigmatism (FV) | Resultant Astigmatism (IV) | Resultant Astigmatism (NV) |
| D1 | 0.63 | 1 | 0.75 | 0.29 | 0.25 | 0.5 |
| D2 | 0.58 | 0.43 | 1 | 0.86 | 0.13 | 0.5 |
| D3 | 0.84 | 0.86 | 0 | 0.71 | 0.75 | 0.33 |
| ... | | | | | | |
| Dn | 0.53 | 0.29 | 0 | 0.14 | 0 | 0.33 |

These values may be normalized on all the set of lenses considered. A value of 0 may correspond to the minimum value and a value of 1 may correspond to the maximum value for the set of lenses considered.

Based on the technical specifications, a weighting coefficient $WC_{i,k}$, which is dependent of the category considered, may be defined for each category as illustrated in table 4. The index i corresponds to the category considered and k corresponds to the technical specification considered. These weighted coefficients enable to define a degree of importance of each specification as a function of the category considered.

TABLE 4 weighting coefficients of the technical specifications of the component

| categories | Field width (FV) | Field width (IV) | Field width (NV) | Resultant Astigmatism (FV) | Resultant Astigmatism (IV) | Resultant Astigmatism (NV) |
|---|---|---|---|---|---|---|
| driving | 0.2 | 0.2 | 0.1 | 0.3 | 0.1 | 0.1 |
| reading | 0.1 | 0.2 | 0.3 | 0.1 | 0.1 | 0.2 |
| sport | 0.1 | 0.1 | 0.1 | 0.1 | 0.1 | 0.2 |
| computer | 0.1 | 0.3 | 0.3 | 0.1 | 0.1 | 0.1 |
| Handiwork | 0.1 | 0.1 | 0.2 | 0.1 | 0.1 | 0.2 |
| running | 0.2 | 0.2 | 0.1 | 0.3 | 0.1 | 0.1 |

Using the values of the technical specifications $T_{j,k}$ and the weighted coefficients of each category $WC_{i,k}$, the weighted score $C_{j,i}$ for each component j of the set of predetermined components and for each category i may be obtained.

For example, the weighted score $C_{j,i}$ of a component j for a category i is a weighted sum of the values of the technical specifications $T_{j,k}$ multiplied by the weighed coefficients $WC_{i,k}$ of each category. These weighted scores give an indication on the relevancy of each component for each category and may be used to determine a component for the given wearer.

Table 5 illustrates the weighted scores for each category for the given wearer $W_i$ and the weighted scores for each category of each component of the set of predetermined components $C_{j,i}$.

| Weighted scores | driving | reading | sport | computer | handiwork | running |
|---|---|---|---|---|---|---|
| Wearer | $W_1 = 1$ | $W_2 = 0,2$ | $W_3 = 0,4$ | $W_4 = 0,2$ | $W_5 = 0,1$ | $W_6 = 1$ |
| D1 | 0.4 | 0.3 | 0.2 | 0.6 | 0.1 | 1 |
| D2 | 0.1 | 0.6 | 0.1 | 0.3 | 0.3 | 0 |
| D3 | 0.7 | 0.1 | 0.1 | 0.3 | 0.3 | 0.1 |
| Dn | 0.8 | 0.1 | 0.1 | 0.1 | 0.3 | 0.3 |

In sub-step S430, the component is determined based on the weighted score attributed to each category to the wearer and to each component of a set of predetermined components, by calculating a merit function for example.

It may be established, for example, that a particular lens design j, here the lens design Dn, is the most adapted to the profile of the wearer, by selecting the lens design that has the smallest merit function associated.

According to another embodiment, a plurality of components of the same type may be determined when the associated merit function is smaller than a predetermined threshold, for example, and the method may comprise a sub-step in which the eye-care professional may determine at least one component of the ophthalmic equipment by selecting one of the plurality of components determined.

According to another embodiment, a plurality of components may be determined simultaneously or subsequently. Step S400 may thus comprise a plurality of steps of determining a component, wherein each component is of a different type or step S400 may comprise a step of determining a combination of components. When components of the ophthalmic equipment are not determined in step S400 so that some components are missing, a step S500 of determining the ophthalmic equipment may be performed. The missing components may be determined by other means, i.e. by direct choice of the eye-care professional or the wearer using a questionnaire, for example.

FIG. 2 illustrates schematically a system that may be used to implement the method previously described according to a preferred embodiment.

The system 1 comprises a collecting unit 2, a centralized treatment unit 3 and a display unit 4. The collecting unit 2 is configured to perform the steps S100 to S300 and to send the set of characteristics relative to the wearer with an identification data of the wearer to the centralized treatment unit 3. The centralized treatment unit 3 is configured to perform at least the step S400 of determining at least a component of the ophthalmic equipment. The centralized treatment unit 3 is also configured to send data relative to the determined at least a component of the ophthalmic equipment to the display unit 4. The display unit 4 is configured to display the determined at least a component of the ophthalmic equipment. Optionally, the display unit 4 may also be configured to determine the ophthalmic equipment, when not all the components of the ophthalmic equipment are determined in step S400. The collecting unit 2 and the display unit 4 may be comprised within a single device such as a personal device of the wearer. The collecting unit 2 and the display unit 4 may also be comprised within two separate devices. A personal device of the wearer may comprise the collecting unit 2 and a computer of the eye-care specialist may comprise the display unit 4, for example.

FIG. 3 illustrates the system of FIG. 2, according to an embodiment wherein the collecting unit 2 and the display device 4 are comprised within a single device 5 such as a computer, a tablet or a smartphone. The centralized treatment unit 3 is a server connected to the device 5 via the internet. Preferably, the server is part of a cloud network.

In particular, the device 5 comprises a memory 51, a processor 52, a display 53, a communication interface 54 and a keyboard 55. The memory 51 comprises a set of instructions corresponding to the steps S100 to S300 previously mentioned which are retrieved and executed by the processor 52. The device 5 may comprise a keypad or keyboard 55 which may be used to launch the program product comprising the instructions stored in the memory 51 and to enter the data necessary for providing access to the digital content of the wearer such as usernames or log in and passwords for social network, for example. The processor 52 is also configured to send the set of characteristics of the wearer and eventually an identification data of the wearer to the communication interface 54. The processor 52 is also configured to receive from the centralized treatment unit 3 the data relating to the at least a component of the ophthalmic equipment determined.

The centralized treatment unit 3 comprises a communication interface 31, a processor 32 and a memory 33. The communication interface 31 is configured to receive the set of characteristics of the wearer and eventually the identification data of the wearer from the device 5. A set of instructions corresponding to step S400 is stored in the memory 33 and executed by the processor 32 to determine at least a component of the ophthalmic equipment. The data relating to the at least a component of the ophthalmic equipment are sent to the device 5 via the communications interface 31.

The invention claimed is:

1. A method for determining an ophthalmic equipment which is adapted to characteristics of at least a given wearer, the method being implemented by a processor, the method comprising:
providing access to digital content of the wearer;
analyzing the digital content of the wearer to extract wearer data;
processing the wearer data to obtain a set of characteristics, the set of characteristics comprising a plurality of categories and at least one score associated to each category, wherein the plurality of categories relates to at least one of a behavior of the wearer and an environment of the wearer; and
determining at least one component of an ophthalmic equipment based on the obtained set of characteristics, wherein the component is defined by a set of technical specifications, and the determination of the component includes:
determining, for the wearer, a weighted score for each category based on the at least one score associated to each category,
determining, for each component of a set of predetermined components of an ophthalmic equipment, a weighted score for each category, and
determining the at least one component of the ophthalmic equipment from the wearer's weighted score and the component's weighted scores of each of the categories.

2. The method for determining an ophthalmic equipment according to claim 1, wherein providing access to the digital content of the wearer comprises collecting the wearer data including navigation data of the wearer including navigation cookies.

3. The method for determining an ophthalmic equipment according to claim 1, wherein:
each category relates to at least one of a behavior or environment of wearers, and
each score associated to a category is computed based on at least one of a relative intensity, a frequency or a duration of the wearer having a behavior related to the category or being in an environment related to the category.

4. The method for determining an ophthalmic equipment according to claim 1, wherein the wearer data comprises pictures and/or videos and processing the wearer data comprises attributing a category to the pictures and/or videos.

5. The method for determining an ophthalmic equipment according to claim 1, wherein the wearer data comprises words and wherein processing the wearer data comprises attributing a category based on a presence, within the words comprised in the wearer data, of key-words representative of the category.

6. The method for determining an ophthalmic equipment according to claim 1, wherein
the digital content of the wearer comprises social network data, and
analyzing social network data comprises determining at least one social network data associated with a flag indicating an interaction of a wearer with said social network data and extracting wearer data from said social network data.

7. The method for determining an ophthalmic equipment according to claim 1, wherein determining at least one component of an ophthalmic equipment comprises determining, by implementing a decision tree, at least one component of the ophthalmic equipment, the decision tree comprising leaves and nodes, the leaves corresponding to at least one component of the ophthalmic equipment and some of the nodes corresponding to conditions to be met depending on values of scores of the at least one category.

8. The method for determining an ophthalmic equipment according to claim 1, wherein determining the at least one component of the ophthalmic equipment comprises determining a coating based on at least a score of a category relative to an environment of the wearer.

9. The method for determining an ophthalmic equipment according to claim 1, further comprising determining a frame based on the obtained set of characteristics by determining the frame based on scores of categories relative to a clothing style of the wearer and/or an activity of the wearer.

10. The method for determining an ophthalmic equipment according to claim 1, wherein determining the at least one component of the ophthalmic equipment comprises determining a lens design based on scores of categories relative to an activity of the wearer.

11. The method according to claim 1, wherein the method further comprises a step of storing the set of characteristics of the wearer together with an identification data of the wearer into a database.

12. A non-transitory computer readable medium having stored thereon a computer program comprising one or more stored sequence/s of instructions that is accessible to a processor and which, when executed by the processor, causes the processor to carry out the steps of the method according to claim 1.

* * * * *